Feb. 2, 1971   JEAN-PAUL GOMIS ET AL   3,560,283
PROCESS FOR EFFECTING THERMAL SEALING
OF STORAGE CELL CASINGS AND LIDS
Filed Feb. 24, 1969   2 Sheets-Sheet 1

INVENTORS
JEAN-PAUL GOMIS
RENÉ CHASSOUX,
BY
Kenyon & Kenyon
ATTORNEYS

INVENTORS
JEAN-PAUL GOMIS
RENÉ CHASSOUX
BY
ATTORNEYS

United States Patent Office 3,560,283
Patented Feb. 2, 1971

3,560,283
PROCESS FOR EFFECTING THERMAL SEALING OF STORAGE CELL CASINGS AND LIDS
Jean-Paul Gomis, Pavillons-sous-Bois, and René Chassoux, Talence, France, assignors to Societe des Accumulateurs Fixes et de Traction (Societe Anonyme), Romainville, Seine-Saint-Denis, France, a company of France
Filed Feb. 24, 1969, Ser. No. 801,355
Claims priority, application France, Feb. 29, 1968, 141,783
Int. Cl. B29c 27/00; B65b 7/00; H01m 1/02
U.S. Cl. 156—69                                8 Claims

ABSTRACT OF THE DISCLOSURE

Thermal sealing of thermoplastic storage cell casings and lids is effected by uniform heating by a single heating means to melt temperature of mating edges of the casing and lid and then applying uniform pressure to the molten plastic edges to join them while reinforcing the casing in the vicinity of its edges. Internal and external beads are formed at the joint and the external bead may be removed to form a smooth unbroken line at the joined casing and lid. The apparatus includes a single heating device movable into uniform distances from aligned edges of the casing and lid to heat such edges uniformly to melt temperature and removable thereafter to permit the melted edges to be brought together and joined and also includes reinforcement means for the casing edges as well as means for moving the molten edges in aligned condition together to effect their union, and subsequent trimming off of the external bead formed at the joint.

BRIEF SUMMARY OF INVENTION

The present invention essentially relates to apparatus and to a thermal sealing process for welding the walls of a casing of plastic material to the corresponding walls of a lid similarly of plastic material, so that these walls blend in a substantially unbroken line.

Many well-known processes have been used to join the lid to the casing of a storage cell. Some of such means use an adhesive material to join both parts together, and other means consist in a heat welding process.

Pieces molded of materials such as polyethylene and various grades of polyamides, such as nylon and Rilsan, cannot be readily stuck together with adhesive compounds.

Known thermal welding processes generally use either blow-pipe flame heaters or electrical resistors inserted between lid and casing and heated by Joule effect or induction.

The use of a blow-pipe flame has been found not to give constant results. On the other hand, the use of a resistor delivering the necessary amount of calories has led to a dissymmetrical heating of the parts to be welded together, resulting in a poor seal. Moreover, since the resistor is left embedded in the sealed casing and has an expansion coefficient that is very different from that of the sealed plastic material, the process becomes detrimental in the long run because unequal expansions of resistor and of plastic material weaken and even destroy the previously heated and welded areas.

An object of this invention is to eliminate the drawbacks of known processes. The thermal sealing process according to the invention is particularly remarkable in that the parts to be welded are equally heated to a softening point suitable for effecting good welding and in that the said parts are brought in contact and pressed against each other, causing the interpenetration of the softened and melted parts, means being provided to keep in line the corresponding walls of the casing and lid.

According to an embodiment, heating of the two parts to be welded is provided by radiation or convection by means of a heating plate placed in a direction parallel to the surfaces to be welded, and at an equal distance from each surface, so that heating effect is the same on both faces.

The weld of the lid and casing obtained by the process according to the invention is found to be very good, homogeneous and strong, the wall of the lid being perfectly set in a line with the wall of the casing and two beads of material in excess protruding on each side of the welding line tending to strengthen it.

Eventually, if desired, the external bead can be cut off after welding so that the external wall of the casing is apparently smooth, the internal bead left in place continuing to contribute to strengthening of the seam.

A further object of this invention is to provide a device for welding automatically a lid and a plastic casing of a storage cell and for providing a convenient way to use the process of the invention.

According to the invention, in a first step, the parts to be welded together are prepared so that all moisture is eliminated. This operation comprises, for example, heating moderately the parts in a drying oven in such a way that the geometrical dimensions are left unchanged. After this step, welding is effected by means of a device according to the invention, particularly remarkable in that it comprises:

Means to position and maintain the side walls of a casing containing the constituents of a storage cell in a line with the corresponding walls of a lid in such a manner that the upper plane surface of the casing is in a direction parallel to the lower plane surface of the lid;

Means to drive a heating plate between the said surfaces, respectively, the lower surface of the lid and the upper surface of the casing and to remove the said plate after heating, softening and melting the said opposite surfaces;

Means to press the said surfaces against each other after softening and melting in order to achieve the welding. Advantageously the said heating plate is provided with apertures through which pass the terminal posts connected to the electrode plates lodged inside the casing of the storage cell, so that the heating plate can be brought nearer and at a distance adequate for heating, softening and melting the upper surface of the wall of the casing.

In order to hold tightly in a line the side walls of the lid and casing an internal strengthening piece is placed inside the casing, the said piece comprising a molded frame provided with apertures for the passage of the posts and also appropriate apertures for electrolyte and gas flow. Said piece is located above the electrode plates lodged inside the casing, and is in peripheral snug contact with the internal walls of the casing. Advantageously, this moulded frame is integral with a baffle plate normally used to prevent electrolyte from projecting outwardly, particularly during high rate charge or overcharge. The internal strengthening piece according to the invention not only prevents buckling or deformation of the walls of the casing during welding, but also acts as a thermal screen, protecting the storage cell constituents lodged inside the casing against excess of heat while melting the upper surface of the walls of the casing with the heating plate device.

Complementary to this arrangement, another strengthening frame is place externally around the casing so that its walls are pressed against the internal strengthening piece.

This invention, naturally, relates to casings made of plastic material, sealed according to the invention, said casings being particularly characterized in that a bead protruding from the wall of the casing follows the welding line between lid and casing, at least inside the latter.

Other features, objects and advantages will become apparent from the following description and accompanying drawings of an embodiment given only as example.

DETAILED DESCRIPTION

Figure 1:
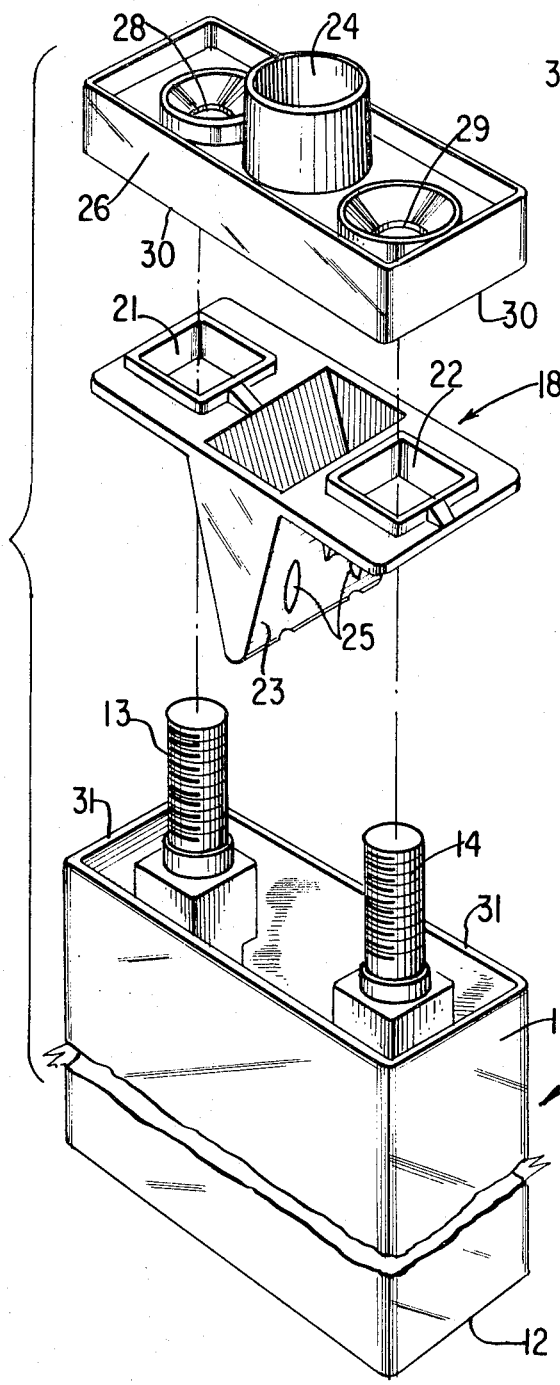
FIG. 1 is an exploded view showing a storage cell casing to be sealed to a lid, according to the invention.
Figure 2:
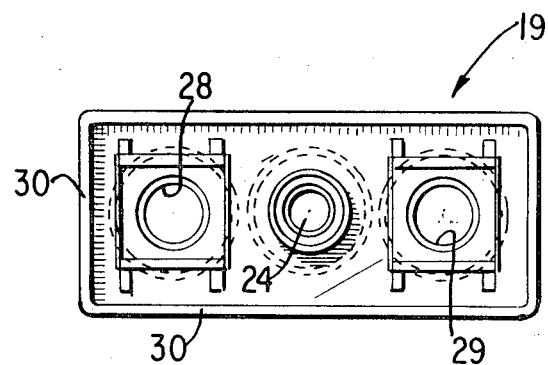
FIG. 2 is a bottom view of the lid shown in FIG. 1.
Figure 3:
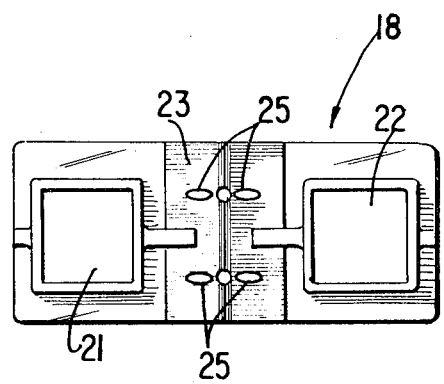
FIG. 3 is a bottom view of the strengthening piece seen under the lid in FIG. 1.
Figure 4:
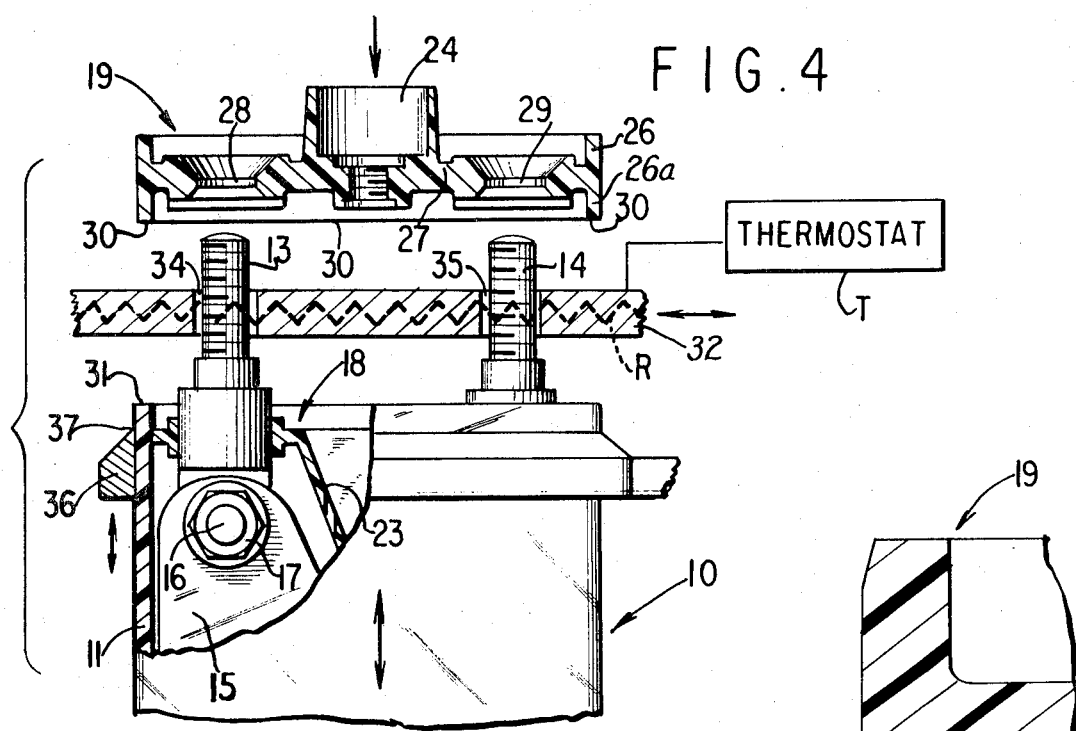
FIG. 4 is a diagrammatic view, on a larger scale, showing partly sectionally and partly in elevation, one phase of a sealing operation according to the invention.

Referring at first to the FIGS. 1 to 3, the casing 10 has a nearly rectangular section and comprises a bottom 12 and walls 11. This casing 10 contains the assembly of electrode plates and separators, both set of plates respectively positive and negative, being bound to the posts 13 and 14. In FIG. 4, the plate lugs 15 of a given polarity are seen bound to a post 14 by a bolt 16 and a screw-nut 17. The corresponding plate lugs of the electrode plates of opposite polarity are similarly bound to post 14.

According to the invention, a strengthening piece 18 is placed inside the casing above the constituents of the storage cell. This piece 18 is advantageously molded of a plastic material which may be the same as that of the casing 10 and lid 19. This piece 18 comprises a frame 20 of a nearly rectangular section, which fits exactly into the internal walls 11 of the the casing 10. The frame 20 is provided with two apertures 21 and 22 for the passage therethrough of the posts 13 and 14. It comprises furthermore a nose-shaped part 23 introduced between the lugs of the electrode plates (FIG. 4) and forming a baffle. The said baffle is of the general type described in U.S. Patent No. 3,018,315, and entitled "Process and Device for Assembling Electrical Storage Cells." As described in this patent, the object of said baffle is to prevent electrolyte from splashing out of the casing through the filling opening 24 in the lid 19, particularly when gas evolution results from a high charging or overcharging rate.

The baffle 23 comprises appropriate apertures 25 permitting to use the opening 24 for filling the storage cell with electrolyte.

The lid 19 has the shape of a frame 26 closed by a partition wall or plate 27 provided with the filling opening 24 and apertures 28, 29 for the passage therethrough of the posts 13, 14. The lid 19 is advantageously of the same plastic material as that of the casing 10. The shape given to the 19 results in a high mechanical strength, particularly to the part 26a of the frame 26 which is rather short and which during assembly comes in line with walls 11 of the casing 10 (FIG. 4).

It must be noted that the lower edge surface 30 of the lid and the opposite upper edge surface 31 of the walls 11 of the casing are both plane and straight, and, therefore, very easy to manufacture.

Figure 5:
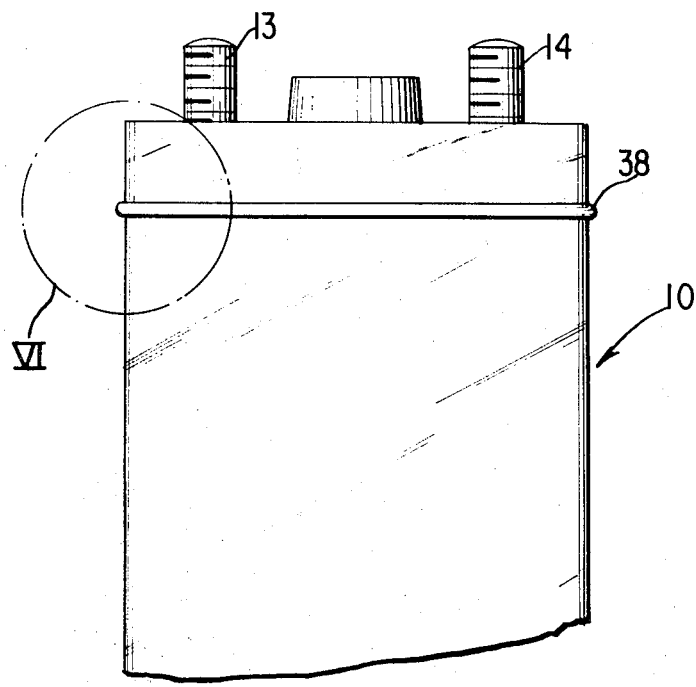
FIG. 5 shows a storage cell with casting and lid sealed according to the invention.

Referring now to FIG. 5, of the drawing illustrating a phase of the welding process according to the invention, the casing 10, into which are housed the electrode plates fitted with posts 13 and 14 and also the strengthening piece used as a baffle 18, is placed facing the lid 19, so that the lower edge surface 30 of the wall 26a exactly faces the upper edges surface 31 of the walls 11 of the casing, said surfaces being parallel.

A heater plate 32 such as a metal plate, for example, provided with electrical heating resistors R is placed between the lid 19 and the casing fitted as said above. Advantageously the heater plate 32 comprises a thermostatic device T for fixing the temperature at an accurate and constant value. The plate 32 is provided with two apertures 35 for the passage of the posts 13 and 14.

Further a strenghening frame 36 for example, a metal frame, having a sharp edge 37 is positioned to surround the walls 11 of the casing at the proximity of the edge surfaces 31.

The successive steps for welding may be as follows, for example:

Lid and casing are aligned in spaced relationship so that the corresponding side walls are in a line and at a determined distance apart.

Then, the heating plate 32 is moved in its plane laterally, between the lid 19 and the casing 10 until apertures 34 35 in the heating plate 32 are aligned and above the posts 13 and 14.

Then means are used to move the casing 10 close to the heating plate, the posts 13 and 14 then passing through the apertures 34 and 35. At that moment, the edge surfaces 30 and 31 are separated by a reduced distance. In this position schematically shown in FIG. 4, the edge surfaces 30 and 31 are advantageously situated at the same distance from the respective plane sides of the heater plate 32 so that heat is equally distributed by radiation or convection from the said plate 32 to the plastic material parts, and, therefore, their respective temperatures are substantially the same, so that the mutual welding of casing and lid is greatly improved.

When the appropriate temperautre for welding is reached, the above-mentioned means used to move the casing 10 is used now to move it away from the heater plate 32 and the heater plate 32 is also removed (in a direction parallel to its plane). Then the means to drive the casing is operated to press the edge surfaces 30 and 31 against each other to achieve the welding. Advantageously, the pressure for applying the casing against the lid is adjusted, for example, to a substantially constant value and welding is due to interpenetration of the melted parts of the lid and casing, for example of the edges 30 and 31 which have been pressed together. This pressing together forms internal and external beads along the welded joint.

Figure 6:
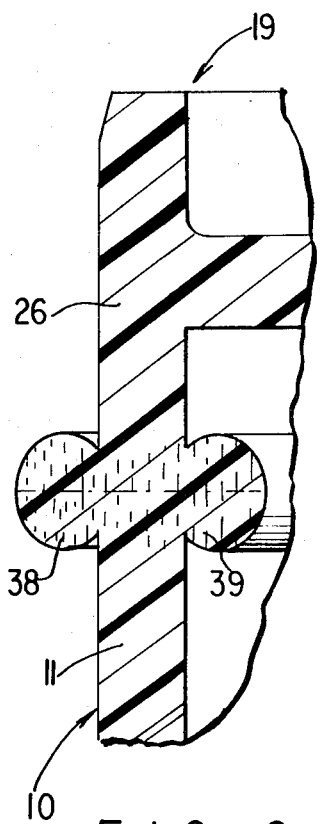
FIG. 6 is a sectional view, on a magnified scale, of part of the wall circled as VI in FIG. 6.

The two beads 38 and 39 so formed are shown in FIGS. 5 and 6, respectively extending inwards and outwards of the casing.

Subsequently, if desired, the external bead 38 can be cut away, by pushing the casing 10 through the frame 36 since the sharp edge 37 of the latter will cut the bead 38 away, and leave the external surfaces of the joined lid and casing smooth and unbroken.

During the sealing the corresponding walls of the casing and lid will not move out of a line, according to the invention, because of the rigidity of the short walls of the lid and also because the walls of the casing at the casing at the proximity of the surface 31 are squeezed by the double effect of the internal strengthening piece 18 and the external frame 36. For example, the frame 36 is made to move integrally with the means that moves the casing 10 during the welding.

It must be noted that the piece 18 and the frame 36 are used not only as a holding device during sealing, but act also as thermal screen and thermal reserve respectively, to prevent the lower part of the casing 10 from overheating which would damage the storage cell constituents.

As a rule, the conditions for a good welding do not only require that the parts are very plane and clean (particularly the surfaces 30 and 31) but these parts (lid and casing) must also be prepared so that all trace of moisture is eliminated. In fact, polyamide materials have a tendency to absorb moisture in a sufficient quantity to disturb the welding process, the vapor produced by the heat radiated from the plate leading in such event to an irregular and even porous seal. To remedy such a drawback, the casing and the lid must be dried off for a suitable time, at a temperature compatible with the type of the plastic material used. Good results have been obtained with the polyamide sold under the trademark "Rilsan" after a pre-heating drying treatment at about 70° C. for about 20 hours. When sealing is about to be effected, the casing is taken out from the drying oven the block of electrodes and separators is placed inside the casing, then the corresponding lid is taken out of the drying oven; the casing and lid are then directly placed in the welding apparatus. All these operations can be automatically performed.

As for the characteristics of the heater plate 32, a constant and well-determined temperature is essential, and thermostatic regulating means T for example should be provided. Moreover, to avoid boundary effects, the dimensions of the heater plate 32 should be distinctly larger than the section of casings and lids. The temperature of the plate naturally depends on the plastics material to be welded. The higher this temperature is the shorter must be the heating period. This period should be long enough, however, to achieve the required accuracy. For example, in the case of "Rilsan" type polymer, having a melting point between 185° and 190° C. the heating plate can be left at 450° C. for 25 seconds approximately between the lid and casing at a suitable distance from each other. Besides, heating can be controlled visually, because "Rilsan" material shows a certain transparency when the right melt and welding temperature is attained.

To produce casings thoroughly sealed to their lids, and having a given substantially constant height, a constant pressure of suitable value is advantageously applied during welding. For example, very good results have been obtained with "Rilsan," at a pressure of about 300 g./mm.$^2$. In order to obtain more accuracy in said height, a constant pressure may be applied during the major part of the welding period, and then the sealing operation is completed at the fixed height.

Other means for obtaining a fixed height may be used; for example, the bottom of the casing can be strictly plane with a given overthickness, and the final dimension may be obtained by reducing the overthickness after sealing as by machine trimming.

Naturally, this invention is in no way limited to the described and illustrated embodiment given only as an example. More particularly, many modifications can be effected in the successive phases of the thermal treatment and sealing, as well as in the automation of the whole process. For example, the lid may be driven to the casing, the heating plate may be displaced by a motion of rotation or translation, and so on. This invention comprises thus all equivalent technical means or combinations of these within the scope of the claims defining the invention. There is no intention of limitation to the exact disclosure herein presented. It may also be used effectively for effecting sealing junctures between lids and casings of thermoplastic material having any selected types of contents.

What is claimed is:

1. A process for effecting a sealed closure joint between a thermoplastic casing and a thermoplastic lid of a storage cell by thermal welding of their mating edges comprising the steps of positioning the lid and casing so that the respective edges thereof to be welded are aligned and in determined spaced apart relationship, introducing a single heating element between the spaced apart aligned edges, moving the respective aligned edges of the casing and lid to a determined like distance from said heating element to elevate said edges to like melting temperature, providing internal and external reinforcement of the casing in the region of its edges during application of melting heat from said element, then removing said heating element and while maintaining said reinforcement moving said lid and casing together to bring their so-heated edges into limited pressing engagement with each other to effect inter-penetrations of the molten plastic of the heated edges and welding joined fusion thereof, together with formation of internal and external beads at the so-joined edges.

2. A process according to claim 1, wherein the heat of said element is directed towards said edges by radiation and convection without direct contact between said edges and said element.

3. A process according to claim 1, wherein said external bead is subsequently removed to provide smooth unbroken surfaces at the welded joint between said edges of said lid and casing.

4. A process according to claim 1, including maintaining uniform determined pressure between the molten edges of the lid and casing while effecting their juncture.

5. A process according to claim 4, wherein said pressure is limited and maintained constant during welding to effect a weldedly joined casing and lid of determined dimensions.

6. A process according to claim 1, including control of the temperature of the heating element to known limits.

7. A process according to claim 1, including the step of preheating the lid and casing to eliminate moisture from both prior to application of melting heat to said edges.

8. A process according to claim 1, including the step of introducing a heat protective member into the casing to protect its contents from the heat of said heating element.

References Cited

UNITED STATES PATENTS

| | | | |
|---|---|---|---|
| 1,784,216 | 12/1930 | Aldrich et al. | 136—170X |
| 3,018,315 | 1/1962 | Hebben | 136—163 |
| 3,299,193 | 1/1967 | Vergara | 264—248X |
| 3,441,448 | 4/1969 | Hayward et al. | 136—137 |

FOREIGN PATENTS

| | | | |
|---|---|---|---|
| 731,255 | 3/1966 | Canada | 136—170 |
| 932,030 | 7/1963 | Great Britain | 156—69 |

DONALD L. WALTON, Primary Examiner

U.S. Cl. X.R.

136—170, 176; 264—248